W. F. RUNDELL.
Pitman-Connection.
No. 225,645. Patented Mar. 16, 1880.
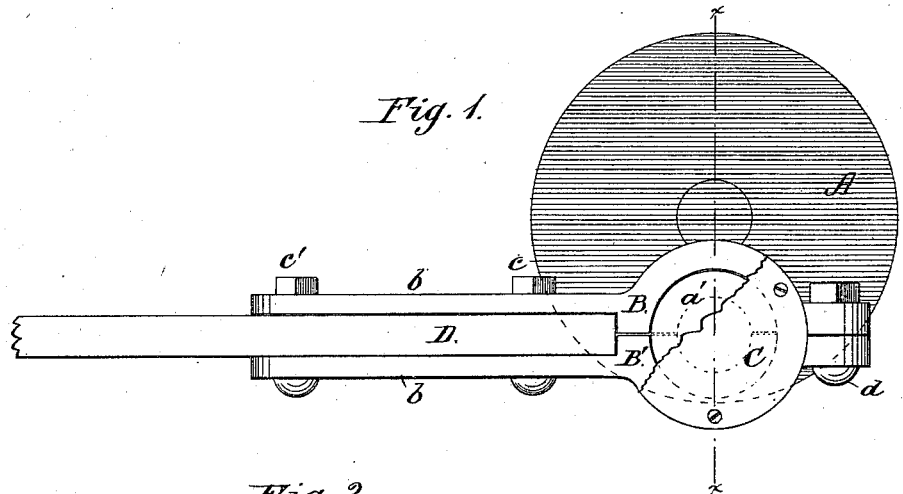
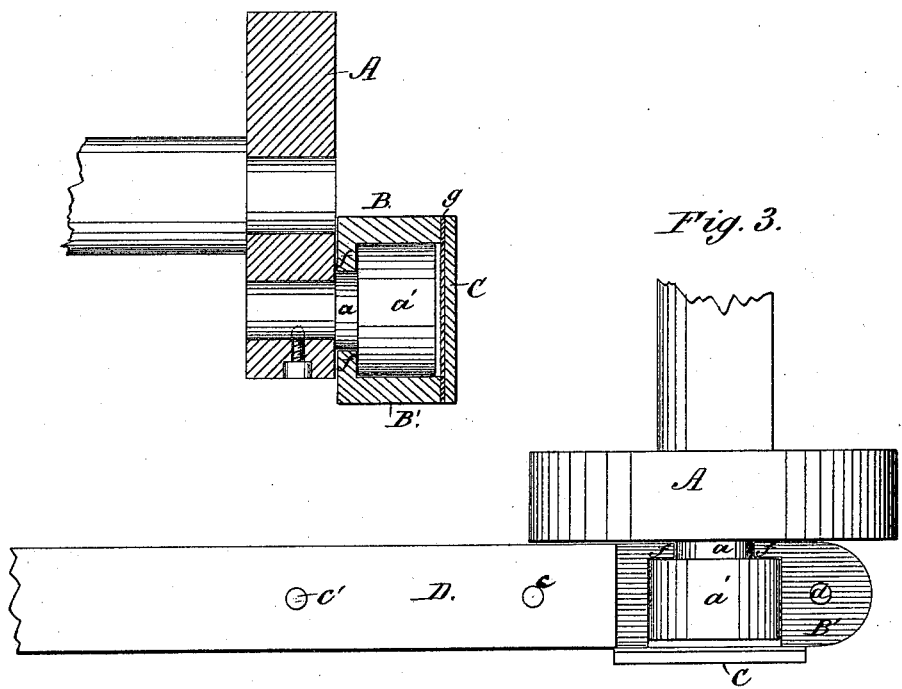

UNITED STATES PATENT OFFICE.

WILLIAM F. RUNDELL, OF GENOA, NEW YORK.

PITMAN-CONNECTION.

SPECIFICATION forming part of Letters Patent No. 225,645, dated March 16, 1880.

Application filed September 20, 1879.

*To all whom it may concern:*

Be it known that I, WILLIAM F. RUNDELL, of Genoa, in the county of Cayuga and State of New York, have invented a new and Improved Pitman-Connection; and I do hereby declare that the following is a full, clear, and exact description of the same, reference being had to the accompanying drawings, forming part of this specification, in which—

Figure 1 is a side view with a portion of the inclosing-plate broken away. Fig. 2 is a vertical section through the line $x$ $x$ of Fig. 1. Fig. 3 is a plan view with the upper half of the pitman-box removed.

My invention relates to an improved pitman-connection for coupling the end of a pitman to a wrist-pin or crank, whereby an increased bearing is obtained, the chamber of the bearing is tightly closed to prevent the escape of oil and entrance of dust, and whereby, also, a head to the wrist-pin is dispensed with.

The invention consists in a wrist-pin made of two diameters, a box having tangs or shanks to be bolted to the pitman, which box is arranged to bear in the plane of the larger diameter of the wrist-pin, the pitman being prevented from slipping off by a flange on the inner sides of the box extending down to and fitting the smaller diameter of the wrist-pin, while a gasket and circular plate on the outside is screwed to the box to inclose the wrist-pin and make an oil-tight bearing, as hereinafter fully described.

In the drawings, A represents a disk on the drive-shaft, which is provided with a wrist-pin, $a$ $a'$, of two different diameters, of which the larger diameter forms the bearing-surface in the plane of which the pitman acts, while the smaller diameter is of comparatively little length.

B B' represent the box, which is made in sections, having elongated shanks $b$ $b'$, between which the end of the pitman D is secured by bolts $c$ $c'$.

The two parts of the box are made of the same shape, and are also bolted together upon the opposite side of the wrist-pin by bolt $d$. The two half-boxes are arranged to completely envelop the wrist-pin, but their bearing-faces are exclusively in the plane of the larger diameter of the wrist-pin.

Upon the inner sides of the two half-boxes, next to the disk, are formed flanges $f$ $f$, which extend to the smaller diameter of the wrist-pin, and form shoulders that hold the pitman against slipping off. These shoulders have also another function, for it will be seen that the flange on the lower half of the box rises and forms a recess in the bottom, which makes an absolutely tight wall to the oil-chamber, which retains the oil for a long time without allowing it to escape at this side.

For inclosing the outer face of the wrist-pin a separate plate, C, is screwed onto the box and the joint made tight with an interposed gasket, $g$, so that all dust is excluded and the oil is prevented from wasting out on this side also.

My invention, it will be seen, is characterized by the following features of merit: The pitman-box being arranged in the plane of the larger diameter of the wrist-pin, a much larger bearing-surface is obtained, and the parts made capable of longer wear. A perfect oil-cup is formed by the journal-chamber around the journal, and the parts can be run for a long time without requiring repeated lubrication. At the same time, also, dust is excluded and the pitman prevented from slipping off.

My pitman-connection may be used under all circumstances under which such a connection is required; but a specially desirable application of the same is in connecting the wrist-pin and pitman of a mower or harvester.

As a modification of my connection, I may make the box B B' in one piece and screw the wrist-pin into the disk from the outside of the box.

In constructing the box, also, it is made slightly larger than the wrist-pin, so as to form at the closed end a reservoir for the surplus oil.

Having thus described my invention, what I claim as new is—

The pitman-connection consisting of the box B B', having a flange, $f$, and plate C, combined with the wrist-pin $a$ $a'$, made of two diameters, with the box and pitman arranged to bear in the plane of the largest diameter of said wrist-pin, substantially as described.

WILLIAM F. RUNDELL.

Witnesses:
B. L. AVERY,
JOHN S. ROBINSON.